Nov. 7, 1961   R. P. OGDEN   3,007,319
METHOD AND APPARATUS FOR QUICK FREEZING
FOODS BY DIRECT IMMERSION
Filed April 11, 1958   3 Sheets-Sheet 3

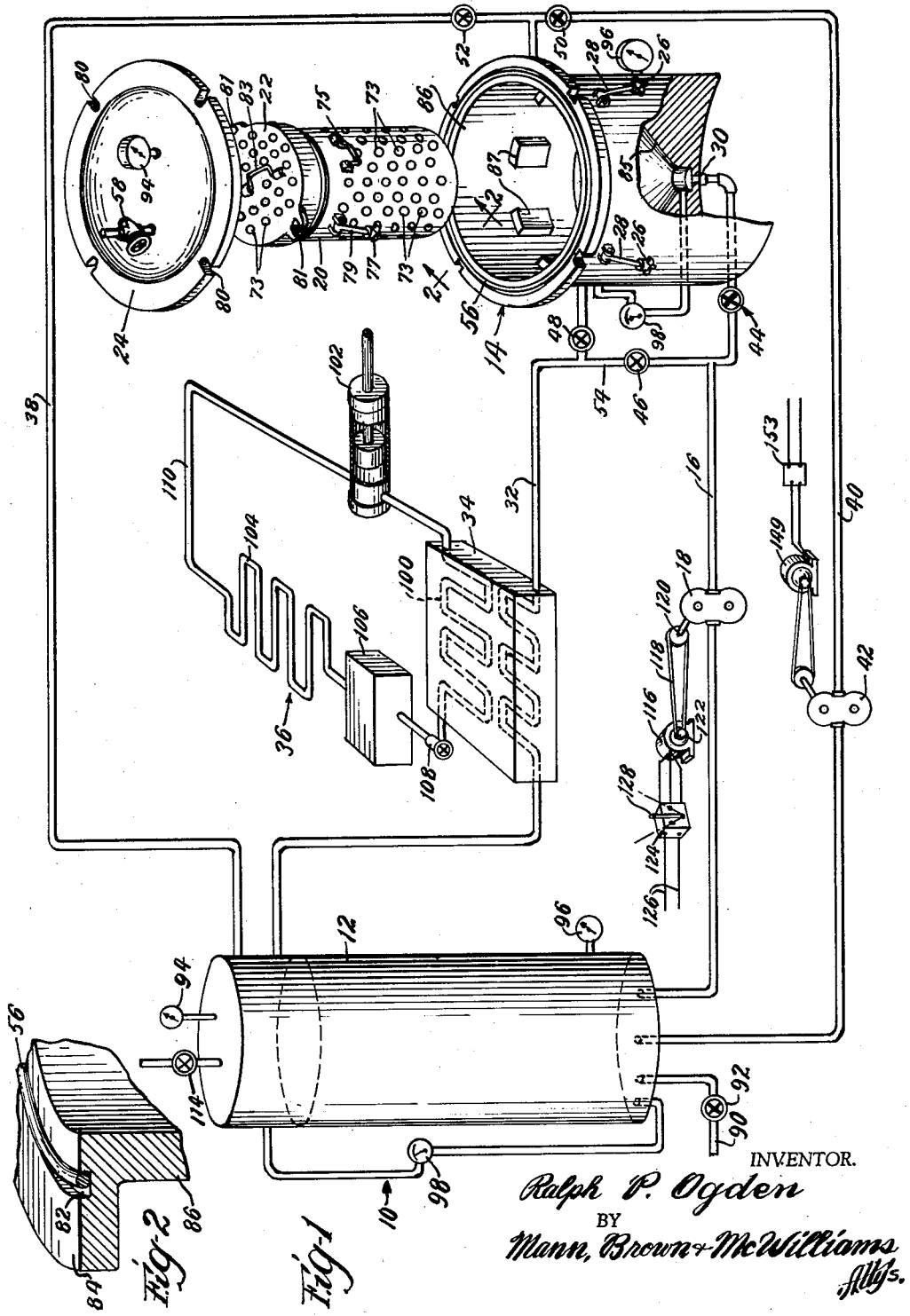

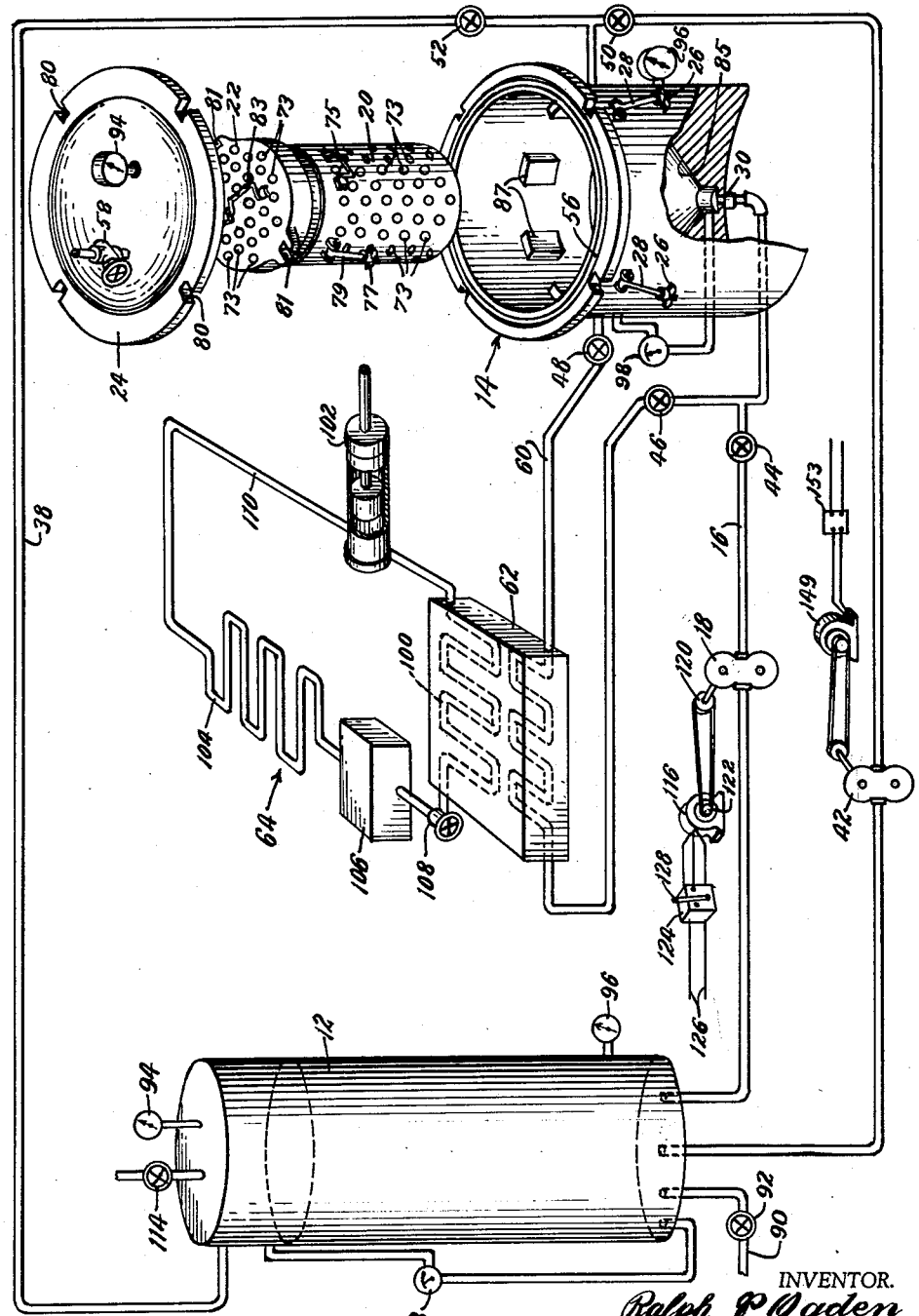

INVENTOR.
Ralph P. Ogden
BY
Mann, Brown & McWilliams
Attys.

United States Patent Office 3,007,319
Patented Nov. 7, 1961

3,007,319
METHOD AND APPARATUS FOR QUICK FREEZ-
ING FOODS BY DIRECT IMMERSION
Ralph P. Ogden, 7522 Walnut St., Hammond, Ind.
Filed Apr. 11, 1958, Ser. No. 727,895
7 Claims. (Cl. 62—64)

My invention relates to a method of and apparatus for quick freezing foods by direct immersion, and more particularly, to freezing foods in a liquid bath as distinguished from methods and apparatus employing cold air or contact with cold metal plates.

Quick freezing methods may be classified into the following groups:

A. Freezing by direct immersion in a refrigerating medium,
B. Freezing by indirect contact with a refrigerant,
C. Freezing in a blast of cold air.

My invention concerns quick freezing of the first type. In this type of quick freezing, the refrigerants most commonly employed are solutions of sugars, glycerol, and sodium chloride. Conventional methods of the direct immersion type all require that the refrigerating medium be a substance that in some way affects the taste or consistency of the food. For instance, the brine solutions that were employed during the initial development of this art were found to be usually unsatisfactory due to the penetration of salt into the tissues of the products being frozen. Later refrigerants proposed were essentially sugar solutions, which could be used only for some fruits but for little else.

While it is recognized that immersion freezing is highly advantageous for the reason that there is perfect contact between the refrigerating medium and the product, and that the resulting frozen product is not a solid block as each piece is a separate unit, each refrigerating medium heretofore proposed has only limited usefulness due to its effect on the frozen product.

Other difficulties recognized in connection with conventional immersion freezing methods are that the refrigeration temperatures must be carefully controlled as at a high temperature the medium will enter the product, while at a low temperature the medium itself may very well freeze, or at least become highly viscous. Since most refrigerants heretofore suggested are solutions, a definite concentration must be maintained, which is also difficult to control. Furthermore, it is proved most difficult to keep the refrigerant free from dirt and contamination.

A principal object of my invention is to provide a method of immersion freezing which overcomes all the difficulties mentioned above by employing liquid carbon dioxide as the media in which the foods are immersed.

A further principal object of my invention is to provide a direct immersion method of freezing foods which employs a tasteless and odorless substance of low viscosity at low temperatures and which is chemically inert.

A further object of the invention is to provide a method of freezing foods that is applicable to meats, fish, vegetables, and to some extent, even fruits, with uniformly satisfactory results.

Yet another object of the invention is to provide apparatus for direct immersion freezing which is economical of manufacture, convenient in use, and applicable to a wide variety of commercial requirements.

Other objects, uses and advantages will be obvious or become apparent from a consideration of the following detailed description and the application drawings in which like reference numerals are employed to indicate like parts throughout the several views.

In the drawings:

FIGURE 1 is a diagrammatic perspective view illustrating the principal components of a preferred freezing system embodying the principles of my invention;

FIGURE 2 is a fragmental cross-sectional view along line 2—2 of FIGURE 1; and

FIGURES 3 and 4 are views similar to that of FIGURE 1 illustrating modified refrigeration systems embodying the principles of my invention.

*General description*

Figure 4:
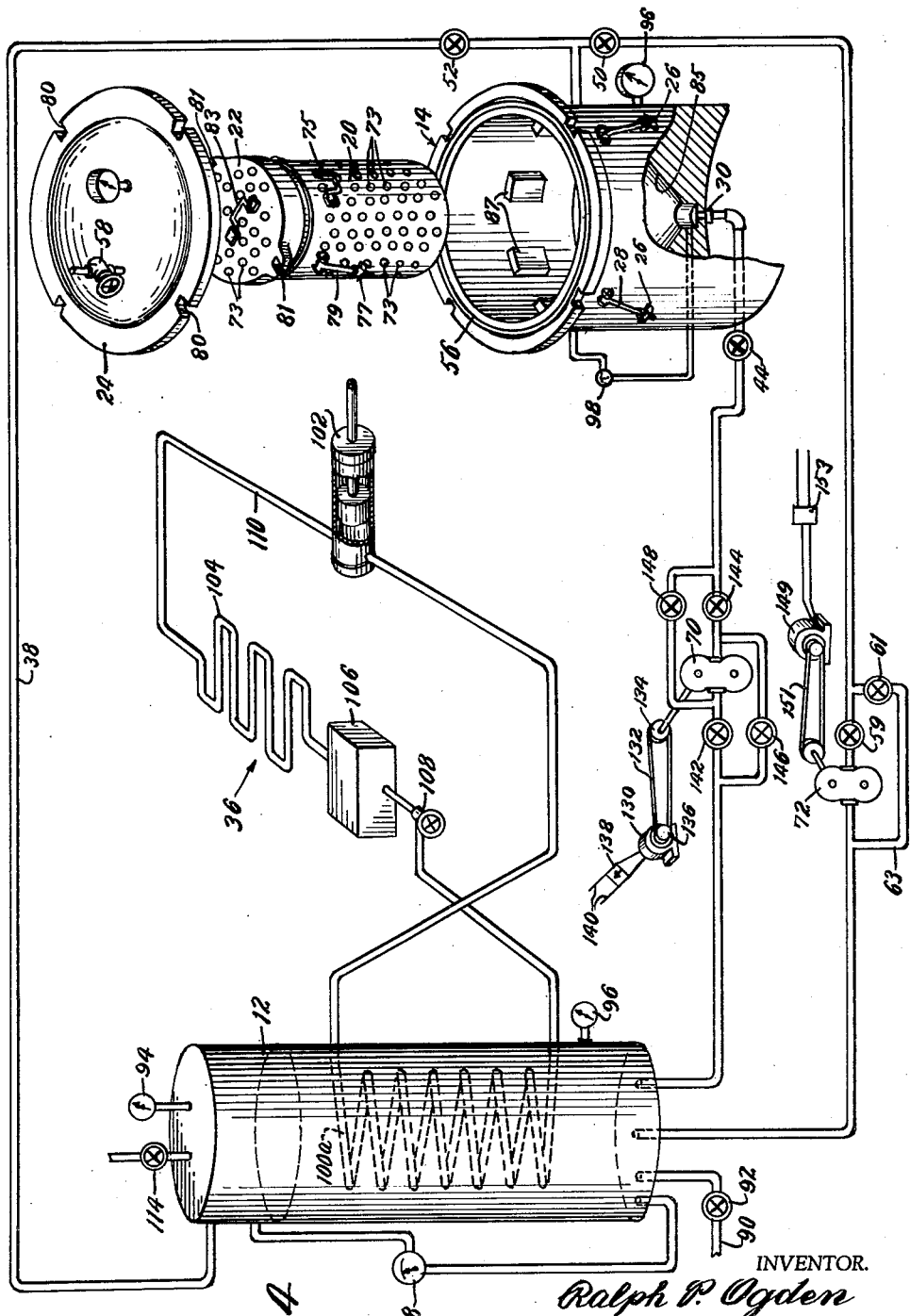

Generally speaking, the objects of my invention are achieved by immersing foods to be frozen in liquid carbon dioxide that is maintained in liquid form at temperatures ranging from plus 10 degrees to minus 70 degrees F., depending upon the nature of the product to be frozen.

Reference numeral 10 of FIGURE 1 generally indicates the principal components comprising a preferred refrigerating system, in accordance with my invention, that accomplishes freezing by immersion in liquid carbon dioxide. The liquid carbon dioxide is stored in a suitable storage tank 12 and is supplied to a freezing chamber 14 through conduit 16 by an appropriate type of reversible pump 18. The food to be frozen is placed in a foraminous basket 20 that includes a removable cover 22, the basket being mounted within chamber 14. Chamber 14 is sealed by a closure member 24 that in the illustrated embodiment is clamped against the top of the chamber 14 by thumb screws 26 cooperating with hinged bolts 28. The liquid carbon dioxide enters the chamber 14 after the cover 24 has been mounted in position through inlet port 30 and substantially fills the chamber, it being circulated back to storage tank 12 through return conduit 32. Return conduit 32 passes through an appropriate form of heat exchange device 34 that is provided with refrigerating apparatus 36 for removing the heat from the returning liquid carbon dioxide that is absorbed from the food as well as other unwanted heat from outside the freezing system. Conduit 38 that extends between the upper portion of the chamber 14 and the upper position of storage tank 12 equalizes the pressure between the storage tank and the freezing chamber after cover 24 has been mounted in sealing relation with respect to the chamber 14, while conduit 40 extends between the upper portion of chamber 14 and the lower end of tank 12 for returning carbon dioxide vapor to the tank 12 after the liquid carbon dioxide has been drained from chamber 14. An appropriate type of compressor 42 is employed to force the carbon dioxide vapor back into the tank 12 wherein it condenses into liquid carbon dioxide as it bubbles upwardly through the body of carbon dioxide maintained in tank 12.

Conventional off-on valves, which may take the form of globe valves of the type employing non-metal seats and are designed for propane service, are employed where indicated at 44, 46, 48, 50 and 52 for controlling the fluid flow through the refrigerating system.

In operation, during the time that chamber 14 is open to the atmosphere, valves 44 and 48 as well as valves 50 and 52 are closed, while valve 46 is open to permit circulation of the liquid carbon dioxide from the lower portion of tank 12 through conduit 16 and bypass conduit 54, into return conduit 32, through heat exchanger 34 and back into tank 12. This maintains the liquid carbon dioxide within tank 12 at the desired temperature, by removing heat absorbed through the storage tank walls, piping, container walls, pumps and valves. When it is desired to freeze a food product, the food is placed in basket 20 and top 22 secured over the open end of the basket to maintain the food within the basket as the liquid carbon dioxide rises in chamber 14. The basket is then placed within chamber 14 over inlet port 30 and cover 24 clamped in place as by employing bolts 28 and wing nuts 26, an O-ring seal or the like 56 (see FIGURE 2) being employed to insure a complete seal between the cover 24 and the chamber 14. After closing the pressure relief valve 58 that is carried by cover 24, valve 46 is closed and valve 52 opened, after which valves 44 and 48 are opened. Pump 18 then forces liquid carbon dioxide into the chamber 14 which it fills until the level of the carbon dioxide reaches the inlet end of conduit 32 after which it proceeds through conduit 32 back to the storage tank 12. When freezing is completed, valve 48 is closed and the operation of pump 18 reversed, which effects a transfer of the liquid carbon dioxide back to the storage tank 12. After the freezing chamber 14 is empty, valves 44, and 52 are closed, and then valves 46 and 50 are opened, compressor 42 being operated to draw carbon dioxide vapor from the freezing chamber and return it to the storage tank 12 and pump 18 being operated to circulate liquid carbon dioxide through conduits 16 and 32.

After the carbon dioxide vapor is substantially removed from chamber 14, which is indicated by a reading of pressure gauge 94 approximating atmospheric pressure, valve 50 is closed and valve 58 opened to equalize the pressure in the chamber with the actual atmospheric pressure. Cover 24 then may be removed to provide access to the basket 20 and its frozen contents. Some carbon dioxide vapor would remain in the chamber 14 when it is opened, but since carbon dioxide is heavier than air, very little of it would be lost to the atmosphere.

In the embodiment of FIGURE 3, the arrangement is such that the liquid carbon dioxide supplied to chamber 14 is in the form of a charge, which is boiled by the food being frozen. The carbon dioxide vapor thus formed is passed through a heat exchanger, condensed and returned to the freezing chamber for reapplication to the food.

The arrangement shown in FIGURE 3 includes substantially the same components as that of FIGURE 1, except that return conduit 32 is omitted and is replaced by a conduit 60 that extends between the upper portion of the chamber 14 and supply conduit 16. Conduit 60 passes through an appropriate type of heat exchange device 62 that may be cooled by any form of refrigeration apparatus such as that diagrammatically illustrated at 64.

In use, after the food has been applied to the basket 20 and same has been sealed in the freezing chamber 14, valve 58 is closed and valve 52 is opened to equalize the pressure between chamber 14 and the storage tank 12; then valve 44 is opened, and pump 18 is actuated to supply a sufficient charge of carbon dioxide to the chamber 14 to cover the food. Valves 44 and 52 are then closed and valves 46 and 48 opened; as the heat is absorbed by the charge of liquid carbon dioxide, the carbon dioxide boils, the vapor rising to enter conduit 60 through which it passes into heat exchanger 62 in which it is condensed and returns by gravity through valve 46 to port 30 of the chamber 14. After the freezing process is completed, valves 46 and 48 are closed and valves 44 and 52 are opened, pump 18 being operated to withdraw the charge of carbon dioxide from the chamber 14 and return it to the storage tank 12. After the liquid carbon dioxide is removed from chamber 14, valves 44 and 52 are closed and valve 50 is opened, compressor 42 being operated to draw the carbon dioxide vapor from chamber 14 and return it to storage tank 12 in which it is condensed by passing upwardly through the body of liquid carbon dioxide in tank 12. In this embodiment of the invention, the tank 12 is provided with an appropriate cooling unit similar to apparatus 64 for maintaining the liquid carbon dioxide in tank 12 at the desired temperature range.

After valve 58 is released, the cover 24 may be removed for access to the frozen food.

In the embodiment of FIGURE 4, the conduit 60 of FIGURE 3 together with valves 46, 48 and heat exchanger 62 are omitted. Assuming that cover 24 has been applied to chamber 14, valve 58 has been closed, and valves 44 and 52 have been opened, the liquid carbon dioxide is supplied to chamber 14 of this embodiment by pump 70 through valve 44. After the chamber 14 is properly charged with liquid carbon dioxide, valves 44 and 52 are closed as is off-on valve 59 that is positioned upstream of compressor 72, and valve 50 is opened, as is off-on valve 61 interposed in bypass conduit 63 that is employed about compressor 72. The temperature in the chamber 14 rises due to the heat gain from the food charge, resulting in a pressure increase, which causes gaseous carbon dioxide (formed by absorption of heat from the food) to flow to tank 12, in which it bubbles up through the liquid carbon dioxide in the latter and condenses. After the freezing is completed, valve 50 is closed and valves 44 and 52 are opened, pump 70 being operated to return the carbon dioxide to tank 12. The remaining carbon dioxide vapor is removed from freezing chamber 14 in the same manner as described above, valve 59 being opened and valve 61 being closed to permit operation of compressor 72.

*Specific description*

The apparatus illustrated in the drawing figures is generally illustrative of types that may be employed for purposes of performing my method of quick freezing.

As illustrated, the storage tank 12 and the freezing chamber 14 are of cylindrical shape with dished ends that are designed to better withstand the pressure under which the system must be maintained to maintain the carbon dioxide in its liquid state. I contemplate that steel would be the material employed in constructing components such as tank 12 and chamber 14. Although liquid and gaseous carbon dioxide are non-corrosive, it would be well to provide a protective coating on the walls of the freezing chamber as there may be some unavoidable condensation of water vapor that might otherwise cause rust. Of course, the storage tank and freezing chamber may extend either vertically or horizontally since the principle of operation would be unaffected. Generally speaking, floor space limitations and methods of handling foods will determine the specific type of mounting that is employed for the storage tank 12 and the freezing chamber 14.

The basket 20 in its illustrated form is made from sheet metal perforated as indicated at 73, as is the basket cover 22. The basket is provided with handles 75 on each side thereof for lifting same, and thumb screws 77 carried by hinged bolts 79 for securing the cover 22 to the basket. The cover 22 is formed with recesses 81 in which the respective bolts are positioned. Cover 22 is provided with handle 83 for manipulating same.

The cover 24 of the freezing chamber, which comprises one end of the freezing chamber in the illustrated embodiment, is formed with recesses 80 for receiving bolts 28 and their wing nuts 26 that cooperate to secure the cover to the freezing chamber. As the wing nuts 26 are turned toward recesses 80 to draw the cover into contact with chamber 14, the cover is pressed against O-ring 56 that is mounted in groove 82 (see FIGURE 2) formed in the upwardly facing surface 84 of the generally cylindrical body 86 that forms chamber 14. The hinge bolt locking devices illustrated are merely illustrative of one type of locking means that may be employed, it being contemplated that screw type locking covers may also be employed, to mention one of several possible alternatives. I also contemplate that the cover would be opened and closed by appropriate power actuated devices to facilitate mass production operations.

Chamber 14 may be provided with conical surface 85 which the bottom of basket 20 is placed in engagement with, abutments 87 being provided about the interior of the illustrated chamber 14 to hold the basket substantially upright.

Of course, all conduits, containers, pumps, valves, compressors and the like that are employed, must be well insulated and this may be done in any suitable manner. The conduit 38 is provided to equalize the pressure between the freezing chamber and the storage tank while transferring liquid carbon dioxide from the freezing chamber so that the pumps only act against the head of pressure generated by the difference in liquid level of the two containers and the resistance of the connected conduits or tubing. It may be added that conduit 38 also insures that chamber 14 is under sufficient pressure prior to the entry of the liquid carbon dioxide therein so that the liquid will not change from its liquid state in the temperature range it is in when supplied to the chamber 14. If the pressure within chamber 14 were not increased after cover 24 is put in place, the carbon dioxide as it entered chamber 14 would change to a mixture of solid and gaseous carbon dioxide, which is contrary to the principles of my invention. As mentioned above, valves 44, 46, 48, 50, 52, 59 and 61 are essentially conventional off-on valves that are provided for the purposes of turning on and shutting off the flow of fluid. I contemplate that these valves in practice would be remotely controlled and power operated by appropriate electrical, pneumatic or hydraulic devices.

The storage tank 12 would be charged with liquid carbon dioxide from any suitable source such as through conduit 90 and off-on valve 92 that is similar in type to those valves already described.

The storage tank 12 and the freezing chamber 14 would be provided with appropriate pressure gauges 94 and thermometers 96 as well as appropriate liquid level indicators 98, the latter being connected to both the vapor and the liquid in any suitable manner, as indicated.

The refrigerating apparatus 36 and 64 that are illustrated in FIGURES 1 and 3 may be of any conventional type, the systems illustrated being supplied to represent a conventional Freon 22 refrigerating system including evaporating coils 100, compressor 102, condenser 104, storage tank 106, and expansion valve 108, all inter-connected by appropriate conduiting 110 as is well known in the art. Refrigerants other than Freon 22 may be employed, as will be obvious to those skilled in the art; even carbon dioxide can be used, but this is not recommended for apparatus such as apparatus 36 due to the horsepower requirements involved. The heat exchangers 34 and 62 may be of any conventional type and no further description is believed necessary. In the embodiment of FIGURE 4, the refrigerating apparatus 36 is shown having its cooling coils 100a built into the storage tank for purposes of cooling the liquid carbon dioxide held in tank 12 as well as for removing the heat that is absorbed from the food. The tank 12 of the embodiment of FIGURE 3 should also have some form of refrigerating apparatus associated therewith to absorb heat entering through the tank walls, as well as that not absorbed by refrigerating apparatus 64. The evaporator coils 100 of apparatus 36 of FIGURE 1 may also be placed in the tank 12, or, in both the embodiments of FIGURES 1 and 3, even in compartment 14.

The tanks 12 may be provided with an appropriate type of bleed-off valve 114 for purposes of removing air that is trapped in the system.

The pumps 18 in the embodiments of FIGURES 1 and 3 are preferably of the reversible type and may be, for instance, conventional gear pumps that are actuated by a reversible electric motor 116 through pulley belt 118 trained over pulleys 120 and 122. As illustrated, motor 116 is shown electrically connected to reversing switch 124 that is in turn connected to the source of electric power by appropriate leads 126. For purposes of description, it is assumed that when switch arm 128 is moved to the right, pump 18 draws carbon dioxide from tank 12 while when the arm is moved to the extreme left position, the operation of the motor and consequently the pump is reversed. In the embodiment of FIGURE 4, pump 70 is assumed to pump only in one direction, it being actuated by an appropriate motor 130 through pulley belt 132 that is trained over appropriate pulleys 134 and 136. Motor 130 may be actuated by turning on appropriate switch 138 that connects same to an appropriate source of electrical energy by means of leads 140.

It is assumed for purposes of this description that when motor 130 is turned on, the pump 70 will draw liquid carbon dioxide from the tank 12 of the embodiment of FIGURE 4 when conventional off-on valves 142 and 144 are closed and similar valves 146 and 148 are open. If it is desired to change the direction of flow, valves 142 and 144 are opened and off-on valves 146 and 148 are closed.

The pumps 18 and 70 illustrated may be, for instance, internal gear positive displacement reversible pumps of the type ordinarily used for transferring liquid petroleum gas, commonly referred to as bottled gas, this type being employed in a proven embodiment of the invention. Gear pumps and vane pumps would also be satisfactory, as would centrifugal pumps, though in the case of the latter the reverse of flow must be accomplished by the valving arrangement illustrated in FIGURE 4. The pressure gauges employed are preferably of the dial type Bourdon tube actuated. The thermometers preferred are the dial type employing a bi-metal actuating mechanism, this type being preferred because it can be screwed directly into a threaded fitting.

The compressors 42 and 72 may be of any conventional type, though conventional reciprocating piston type compressors are preferred, and in instances where the system operates at higher temperatures and pressures, they may be of the multistage type. They may be operated by a suitable electric motor 149 through pulley belt 151, motor 149 being controlled by an appropriate switch 153 that is connected to an appropriate source of electrical energy.

As the refrigerating medium is non-corrosive, the piping required may be formed from steel or copper tubing.

The basket 20, in addition to the form illustrated, may be formed from a wire mesh, cover 22 being hinged to the basket in any suitable manner, and an appropriate latch device being provided to hold the cover in place in its closed position. In all embodiments employed, the cover 22 is necessary since some food products would otherwise tend to float out of the container as the liquid carbon dioxide rises in chamber 14. Basket 20 may be omitted where the chamber 14 is arranged to facilitate unloading, as by being tiltably mounted. In such a case, a cover should be provided for the reason pointed out above for application to an internal shoulder formed inside the chamber, and suitable locking devices, such as hinged bolts and wing nuts employed to lock the cover in place.

Any type of suitable liquid level gauge may be employed to serve as gauge 98, though the differential pressure sensing unit type are preferred.

In practice, the food placed in containers 20 need not be wrapped in any manner, although it may be wrapped or packaged if so desired. However, the wrapping or packaging should be gas and liquid tight as otherwise the liquid carbon dioxide would enter and, when the pressure in the freezing chamber is reduced, damage the package. The baskets 20 illustrated are only suggestive of the type of basket that may be employed, as any suitable foraminous structure may be used. Both the basket and the freezing chamber should be formed so that no pockets or recesses will be provided for trapping liquid as the carbon dioxide will change to its solid state when the pressure is released and then evaporate and be subject to be dispersed in the air when the cover 24 is removed.

I contemplate that most quick freezing of foods in accordance with my method will be done in the minus 20 degrees F. to plus 10 degrees F. range. This involves operating under absolute pressures of from 215 p.s.i. to 360 p.s.i.

In a typical installation, the freezing chamber would have a three foot inside diameter and be four feet in height in the refrigerant receiving portion thereof. The storage chamber would be three feet in inside diameter and stand eight feet high. This will permit a freezing capacity of fifteen hundred pounds per hour in fifteen minute cycles with the food occupying approximately one-quarter of the volume of the freezing chamber. Approximately twenty-eight hundred pounds of liquid carbon dioxide would be contained in the storage tank when the freezing chamber was not in operation. The temperatures and pressures would be maintained at that best suited for a particular type of food, which would ordinarily be frozen on a mass production basis. The pressure in tank 12 will drop slightly when the tank is first placed in communication with the freezing chamber; however, the pressure is restored by the compressor when the carbon dioxide is returned to the tank or by absorbed heat restoring the vapor pressure by evaporation.

Vegetables are ordinarily blanched before freezing, and then precooled.

The following test figures are indicative of freezing times required to freeze the principal types of foods, the specific data being obtained in freezing segments of lean beef ½ inch in cross section, precooled to 35° F.:

| Fahrenheit Temp. of liquid $CO_2$, degrees | 10 | 0 | −10 | −20 | −30 | −40 |
|---|---|---|---|---|---|---|
| Time to reach 20° F. in seconds | 305 | 227 | 163 | 130 | 107 | 89 |

The temperature of 20° F. is an arbitrary figure selected after consulting many references on the subject, all of which agreed that when foods are cooled to 20° F., all moisture contained therein has become ice crystals.

The same conditions above have been duplicated for both fruits (apples and grapes) and vegetables (carrots and potatoes) and the freezing time for both the vegetables and fruits averaged 88% of the time required for the beef.

Tests have shown that the thickness of food and the temperature of the liquid carbons dioxide have a much greater effect on the time required for freezing than does the kind of food.

*Advantages of the invention*

The refrigerant employed in accordance with my invention is tasteless, odorless, colorless and non-toxic. It does not affect the food chemically in any way, and leaves no residue. Moreover, it does not penetrate foods. It has a relatively low viscosity when a liquid at temperatures ranging from plus 32 degrees F. to minus 70 degrees F. This viscosity changes very little over this temperature range. As the refrigerant operates within a system that is necessarily sealed, the refrigerant is easily kept free of dirt and contamination, suitable filters being provided where the nature of the food being frozen requires this to keep food particles from leaving chamber 14.

Therefore, the nature of liquid carbon dioxide is such that, when used in accordance with my invention, the inherent advantages of the immersion type quick freezing method are obtained while the disadvantages are either eliminated or materially reduced. Although substantial pressures are required to maintain the carbon dioxide in its liquid state, the method is quite feasible with even small sized equipment, and I contemplate that portable apparatus employing my method may be provided. As liquid carbon dioxide is non-corrosive, inexpensive materials may be used to form the components required.

Since food can be directly immersed in the liquid carbon dioxide, a very fast freezing action results. All meats, fish and vegetables can be frozen by this method; even a number of fruits, when frozen in accordance with my invention, and subsequently thawed out, will be palatable, where they would be almost inedible when frozen by other methods. Meats are frozen so rapidly that there is a minimum of tissue juice exuded when the meats are thawed, indicating a relatively minor amount of cell damage.

Carbon dioxide is readily available in both the solid and liquid states at a reasonable cost, the solid form being available at the present time at about four cents a pound. The solid form is easily converted to the liquid form by readily available conventional equipment.

The foregoing description and the drawings are given merely to explain and illustrate my invention and the invention is not to be limited thereto except insofar as the appended claims are so limited, since those skilled in the art who have my disclosure before them will be able to make modifications and variations therein without departing from the scope of the invention.

I claim:

1. Freezing apparatus comprising a freezing chamber, including an access opening, a removable closure for closing said access opening, means for fixing the closure in sealing engagement with the chamber, a liquid carbon dioxide circulation system, said system including a storage chamber, supply conduit means extending between said storage chamber and said freezing chamber, pump means interposed in said supply conduit means, off-on valve means interposed in said supply conduit means between said pump means and said freezing chamber, and a quantity of liquid carbon dioxide substantially filling said storage chamber, a carbon dioxide cooling system, said cooling system comprising heat absorbing means, supply conduit means extending between said heat absorbing means and the upper portion of said freezing chamber, and a return conduit extending between said heat absorbing means and the lower portion of said freezing chamber, said heat absorbing means being positioned vertically above said freezing chamber, and off-on valves interposed in said supply and return conduits.

2. The freezing apparatus set forth in claim 1 including further conduit means extending between the upper portion of said freezing chamber and the lower portion of said storage chamber, compressor means interposed in said further conduit means, and off-on valve means interposed in said further conduit means between said compressor means and said freezing chamber.

3. The freezing apparatus set forth in claim 1 including further conduit means extending between the upper portion of said freezing chamber and the upper portion of said storage chamber, and off-on valve means interposed in said further conduit means, whereby the pressure in said freezing chamber may be equalized with that in said storage chamber after said closure has been fixed in sealing position by opening the last mentioned valve.

4. Freezing apparatus comprising a freezing chamber, including an access opening, a removable closure for closing said access opening, means for fixing the closure in sealing engagement with the chamber, a liquid carbon dioxide circulation system, said system including a storage chamber, supply conduit means extending between said storage chamber and said freezing chamber, pump means interposed in said supply conduit means, further conduit means extending between the upper portion of said freezing chamber and the lower portion of said storage chamber, compressor means interposed in said further conduit means, off-on valve means interposed in said further conduit means between said compressor means and said freezing chamber, bypass conduit means extending between the upstream and downstream sides of said compressor means, the upstream end of said bypass conduit means being positioned between said compressor means and the last mentioned off-on valve means, off-on valve means interposed in said bypass conduit means, off-on valve means interposed between the upstream side of said compressor means and the upstream end of said bypass conduit means, and a quantity of liquid carbon dioxide substantially filling said storage chamber.

5. The method of freezing foods which includes establishing a liquid carbon dioxide circulation system including a storage chamber containing a body of liquid carbon dioxide and a freezing chamber, placing the food in the freezing chamber and sealing off the freezing chamber from the atmosphere, substantially equalizing the pressure in the freezing chamber with that in the storage chamber, covering the food in the freezing chamber with liquid carbon dioxide from the system, and while maintaining the food immersed in such liquid carbon dioxide until it is frozen, supplying the carbon dioxide vapor thus formed in the freezing chamber to the storage chamber and bubbling said vapor through the body of liquid carbon dioxide in the storage chamber to condense said returned vapor, removing from the carbon dioxide in the storage chamber the heat absorbed from the food, then returning to the system substantially all of the carbon dioxide remaining in the freezing chamber, sealing off the freezing chamber from the storage chamber, and opening the freezing chamber to the atmosphere and removing the food therefrom.

6. Apparatus for quick freezing of food by immersion in liquid carbon dioxide, said apparatus comprising a freezing chamber having an access opening, a removable closure for closing said access opening, means for fixing the closure in sealing engagement with said chamber, a liquid carbon dioxide circulation system, said system including a storage chamber, supply and return conduit means extending between said freezing chamber and said storage chamber, pump means interposed in one of said conduit means, and means for maintaining said circulating system under substantially constant pressure conditions, and a carbon dioxide cooling system for removing the heat absorbed by the carbon dioxide from the food, said cooling system comprising a heat absorbing medium, means for cooling said heat absorbing medium, and heat exchanger means through which said heat absorbing medium is circulated, a bypass conduit communicating between the downstream portion of said supply conduit means and the upstream portion of said return conduit means, off-on valve means interposed in said supply conduit means between said bypass conduit and said freezing chamber, off-on valve means interposed in said return conduit means between said bypass conduit and said freezing chamber, and off-on valve means interposed in said bypass conduit between said supply and return conduit means, said heat exchanger means being in heat exchange relation with the carbon dioxide as it passes through said return conduit means and downstream of said bypass conduit means, whereby, when the food to be frozen is placed in said freezing chamber, said closure is fixed in sealing engagement with said freezing chamber, the first and second mentioned valves are opened, and the third mentioned valve means is closed, on operation of said pump means, liquid carbon dioxide may be circulated through said freezing chamber and about the food, and whereby the heat absorbed from the food by the carbon dioxide is transferred to said heat absorbing medium at said heat exchanger means, and including means within said freezing chamber for overcoming the buoyancy of the food to maintain the food submerged in the liquid carbon dioxide.

7. Apparatus for quick freezing of food by immersion in liquid carbon dioxide, said apparatus comprising a freezing chamber having an access opening, a removable closure for closing said access opening, means for fixing the closure in sealing engagement with said chamber, a liquid carbon dioxide circulation system, said system including a storage chamber, supply and return conduit means extending between said freezing chamber and said storage chamber, pump means interposed in said supply conduit means, and means for maintaining said circulation system under substantially constant pressure conditions, said return conduit means communicating between the upper portion of said freezing chamber and the lower portion of said storage chamber, and a carbon dioxide cooling system for removing the heat absorbed by the carbon dioxide from the food, said cooling system comprising a heat absorbing medium, means for cooling said heat absorbing medium, and heat exchanger means through which said heat absorbing medium is circulated, said heat exchanger means being in heat exchange relation with the carbon dioxide at said storage chamber, whereby, when the food to be frozen is placed in said freezing chamber and said closure is fixed in sealing engagement with said freezing chamber, and said freezing chamber is charged with liquid carbon dioxide on operation of said pump means, carbon dioxide vapor formed by the absorption of the heat from the food passes from the freezing chamber to said storage chamber, under the pressure increase built up by the temperature rise caused by said heat absorption, and condenses as it bubbles up through the liquid carbon dioxide in said storage chamber, and whereby the heat thereby absorbed by the liquid carbon dioxide in said storage chamber is removed therefrom through said heat exchanger means.

References Cited in the file of this patent

UNITED STATES PATENTS

| | | |
|---|---|---|
| 1,933,257 | Goosman | Oct. 31, 1933 |
| 2,137,902 | Walter | Nov. 22, 1938 |
| 2,502,527 | McFarlan | Apr. 4, 1950 |
| 2,618,939 | Morrison | Nov. 25, 1952 |